United States Patent [19]

Zuzelo

[11] Patent Number: 5,477,845
[45] Date of Patent: Dec. 26, 1995

[54] SAW BLADE AND MOUNTING MEANS FOR THE SAME

[76] Inventor: Edward A. Zuzelo, 622 Broad Acres Rd., Narberth, Pa. 19072

[21] Appl. No.: 288,704

[22] Filed: Aug. 12, 1994

[51] Int. Cl.⁶ ...................................................... B28D 1/04
[52] U.S. Cl. ............................... 125/15; 30/388; 83/666; 83/698.41
[58] Field of Search ................................ 83/666, 698.41, 83/835; 51/168; 125/15; 30/388; 451/342

[56] References Cited

U.S. PATENT DOCUMENTS

| | | | |
|---|---|---|---|
| 922,049 | 5/1909 | Sanfason | 51/168 |
| 2,649,868 | 8/1953 | Gommel | 51/168 X |
| 2,822,648 | 2/1958 | Metzger et al. | 51/168 |
| 4,497,141 | 2/1985 | Jarby | 83/666 X |
| 4,706,386 | 11/1987 | Wiley | 83/666 X |
| 4,730,952 | 3/1988 | Wiley | 30/388 X |
| 4,787,147 | 11/1988 | Wiley | 83/666 X |
| 5,157,873 | 10/1992 | Rudolf et al. | 83/666 X |
| 5,303,688 | 4/1994 | Chiuminatta et al. | 125/15 |

*Primary Examiner*—Rinaldi I. Rada
*Attorney, Agent, or Firm*—John W. Logan, Jr.

[57] ABSTRACT

A saw blade having a central aperture for mounting on an arbor of a concrete cutting machine is disclosed with the arbor having a raised mounting boss corresponding in shape and size to the central mounting aperture of the saw blade. The central mounting aperture of the saw blade is triangular in shape with one apex of the triangle overlying the perimeter of the arbor and the other two apexes of the triangle within the face of the arbor.

15 Claims, 2 Drawing Sheets

SAW BLADE AND MOUNTING MEANS FOR THE SAME

BACKGROUND OF THE INVENTION

1. Field of the Invention

The present invention relates to saw blades and to means for mounting saw blades on an arbor. More specifically, the present invention relates to novel means for mounting motor driven rotary green concrete cutting blades on a driven shaft in such a manner as to prevent the substitution of blades not specifically designed for the job to be accomplished and the machine being used.

2. Description of the Prior Art

When large slabs of concrete are poured, it is necessary to provide stress grooves in the concrete while the concrete is still green. These grooves should be formed in the concrete as soon after it can be walked on without leaving footprints. When cutting such grooves, a diamond cutting blade is used which normally rotates in an up-cut direction, that is with the blade leaving the surface of the concrete with an upward movement at the leading edge of the cut. This type of cut, if not done properly, will force large particulate matter upwardly through the surface of the concrete, providing an unacceptable cut. There are some low powered light weight green concrete saws which cut a shallow groove at a low rate of speed while simultaneously supporting and troweling the surface being cut. In these machines, the cutting blade is not critical to the operation of the saw. However, in heavier, more powerful machines that can cut two inches or more deep at a speed of ten to twenty feet per minute, it is critical that the blade be matched to the machine and the aggregate in the concrete being cut. Failure to do this will result in a completely unacceptable cut, with the failure to cut the concrete properly usually being blamed on the machine instead of the blade.

Attempts have been made in the past to restrict the use of a concrete saw or the like to a particular saw blade. These attempts have included the provision of non-circular arbors on the saw and corresponding shaped mounting apertures in the saw blade. Examples of such arbors and mounting apertures may be found in U.S. Pat. Nos. 2,649,868 and 2,912,021 to Gommel, U.S. Pat. No. 3,869,795 to Treace and U.S. Pat. No. 5,303,688 to Chiuminatta. All of these examples fail to prevent the use of a wide variety of saw blades with saws having special shaped non-circular arbors. Because of the large market for concrete cutting blades, blade manufacturers refuse to be shut out any segment of that market. All that is necessary to provide a universal blade to fit any arbor is to provide a large central circular aperture in the saw blade and provide a removable mounting adapter with a mounting aperture shaped to fit a particular non-circular arbor. With this, a saw user can buy one adapter and use any type of saw blade, regardless of its' suitability for use with the saw. However, if any portion of the blade mounting aperture is closely adjacent the perimeter of the arbor, it is not possible to use an adapter to mount a different saw blade on the arbor.

With the foregoing in mind, it is an object of the present invention to provide novel mounting means for a saw blade which will insure that a blade, not specifically designed for the saw and the job to be accomplished, cannot be substituted for the required blade.

This object, and other objects of the present invention and the various features and details of the invention will be apparent from the following description of the invention.

SUMMARY OF THE INVENTION

In accordance with the present invention, there is provided an arbor for a saw blade wherein the arbor has a blade engaging surface and a blade mounting boss projecting from the mounting surface to engage the saw blade aperture. The mounting boss is of non-circular shape, preferably a triangle with sides of unequal length, with the apex of one junction of adjacent sides of the mounting boss at the periphery of the arbor. The mounting aperture in the saw blade corresponds to the shape of the arbor mounting boss so that it will closely fit over the mounting boss with a portion of the side surface of the blade in engagement with the mounting surface of the arbor. With this construction it is not possible to provide a mounting adapter for a saw blade to mount a saw blade which does not have an aperture of the same shape and size as that of the arbor mounting boss.

DETAILED DESCRIPTION OF THE ILLUSTRATED EMBODIMENT

Figure 1:
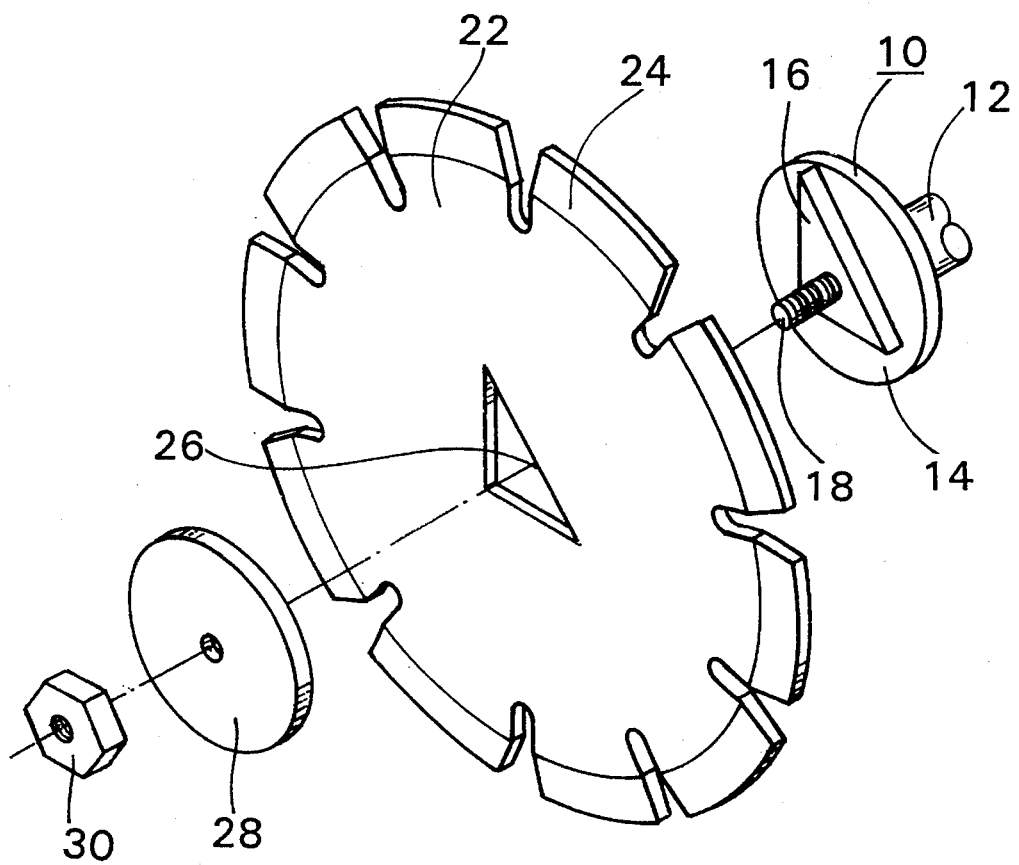
FIG. 1 is an exploded perspective view of the arbor, saw blade and mounting means of the present invention.

Referring more specifically to the drawings, there is shown an arbor 10 made in accordance with the present invention mounted on the free end of a saw blade drive shaft 12. The arbor 10 includes a circular blade support 14 having on its forward face a saw blade mounting boss 16. A threaded shaft 18 projecting forwardly from the mounting boss and coaxial with the drive shaft 12 is also provided as part of the arbor assembly.

Figure 2:
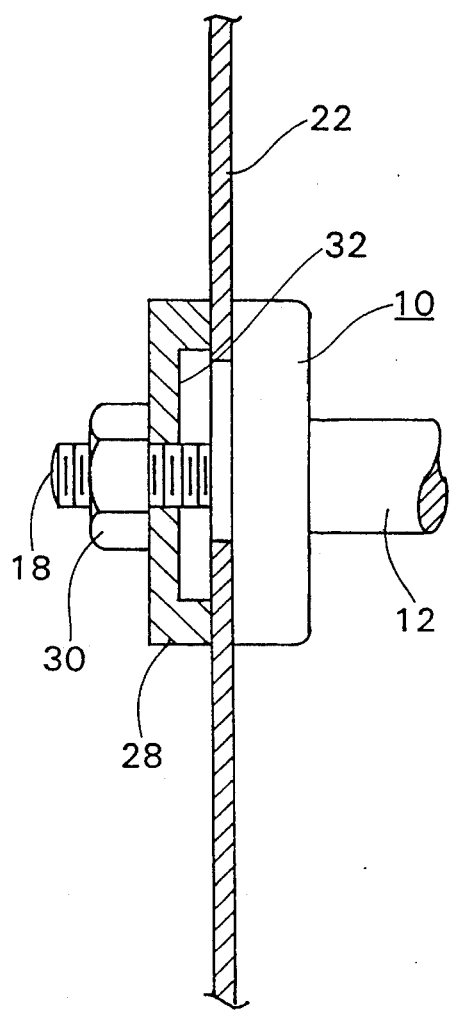
FIG. 2 is a side view, partially in section of the arbor and saw blade of the present invention.

According to the present invention, the extent of the arbor mounting boss is critical to accomplish the objective of this invention. As shown in FIG. 2, the arbor mounting boss 16 is of triangular shape. The shape is not important in that it can be of any shape other than a circular shape concentric with the axis of the drive shaft so long as it exposes a sufficient portion of the area of the face of the blade support 14 to the saw blade and surrounds the threaded shaft 18. The shape of the mounting boss can be four-sided or five-sided or more, or can have a continuously curved perimeter. What is important however, is that one segment of the mounting boss is contiguous with a portion of the outer perimeter 20 of the arbor face 14. So long as this criteria of a portion of the mounting boss being contiguous with the perimeter of the arbor is met, it will not be possible to provide a saw blade with an adapter insert to permit saw blades with other than those with an exact match to the mounting boss contour to be mounted on the arbor as the cut out for the adapter insert must be larger than the diameter of the arbor.

Figure 3:
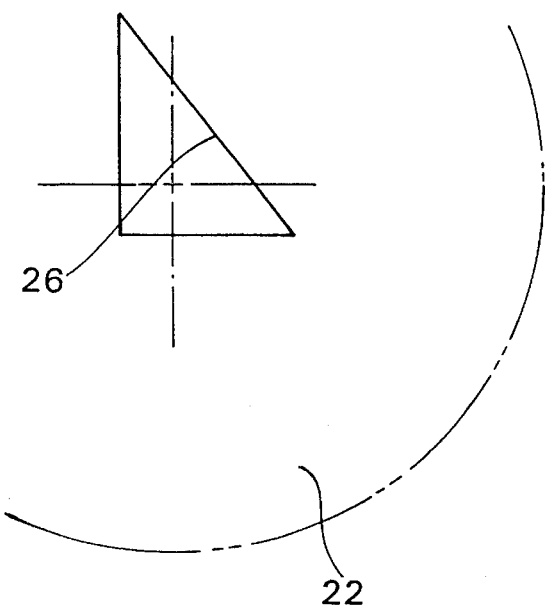
FIG. 3 is a plan view of a saw blade of the present invention.
Figure 4:
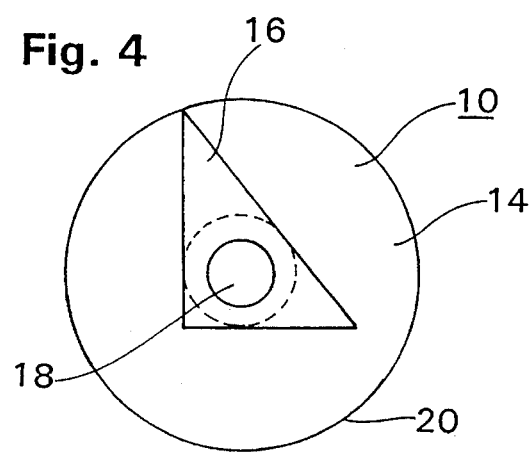
FIG. 4 is a face view of the arbor of the present invention.

The saw blade 22, as shown in FIGS. 1, 2 and 3, is of generally circular shape with cutting segments 24 suitable to accomplish the required cutting task. The saw blade is provided with a mounting aperture 26 corresponding in size and shape to that of the mounting boss 16 of the arbor 10. In the illustrated embodiment of the invention, with the shape of the triangular mounting aperture being other than an isosceles or equilateral triangle, the saw blade can only be mounted on the arbor in one position, thereby assuring that the proper face of the blade is remote from the arbor.

After the saw blade is positioned on the arbor, it can be locked in position with the locking ring 28 and nut 30. The locking ring is a circular metal washer with a recess 32 in the face adjacent the saw blade and a central opening through which the threaded stud 18 projects. With the locking ring in this position, the nut is securely threaded onto the stud to lock the blade to the arbor.

Figure 5:
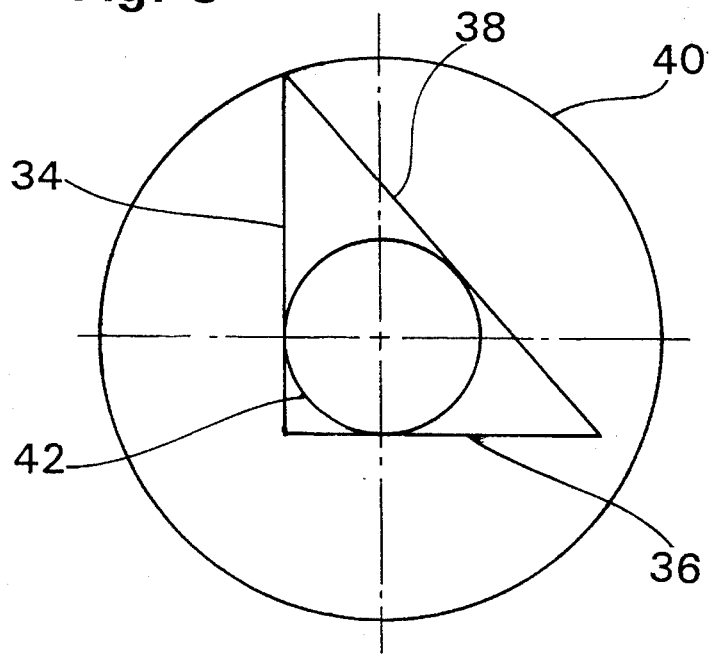
FIG. 5 is a schematic view illustrating the layout of a preferred form of saw blade aperture.

A preferred shape of a saw blade mounting aperture is illustrated in FIG. 5 which is of triangular shape having, relative to FIG. 5, a first vertical side 34, a second horizontal side 36 and a third diagonal side 38 connecting the extremities of the sides 34 and 36. An imaginary circle 40 is drawn at the center of the blade around the intersection of horizontal and vertical blade axes and a second imaginary circle 42 concentric with the first circle.

For a 2 inch diameter mounting arbor, the first circle 40 is ¾ of an inch in diameter and the second circle 42 is 2" in diameter. Each side, 34, 36 and 38 of the triangular saw aperture is tangent to the first circle 40 and the junction of the vertical side 34 and diagonal side 38 lies on the second circle 42. With this arrangement, the first side 34 is approximately 1.40 inches long, the second side is approximately 1.183 inches long and the third side is approximately 1.832 inches long. The mounting boss 16 of the arbor will be of the same shape and approximate size of the saw blade aperture 26 with sufficient clearance to permit the saw blade 22 to be mounted on the arbor.

While particular embodiments of the present invention have been illustrated or described herein, it is not intended to limit the invention to such disclosures, and changes and modifications may be incorporated and embodied therein within the scope of the following claims.

I claim:

1. A concrete cutting saw arbor and saw blade for mounting on the arbor of a concrete cutting saw; said arbor comprising a blade mounting face with a circular perimeter of predetermined diameter; a triangular raised mounting boss on said blade mounting face to receive and position the saw blade; and locking means to lock the saw blade to the arbor; and said arbor raised mounting boss surrounding the center of said arbor and having a shape which when viewed toward the mounting face consists of a series of three connected straight side surfaces projecting vertically from said mounting face with each adjacent surface meeting at a connecting point, the connecting point of two adjacent surfaces lying on the perimeter of said arbor, and the connecting points of the remaining adjacent surface meeting at connecting points on said arbor face outside of an imaginary circle concentric with said arbor and of lesser diameter than the perimeter of said arbor; and said saw blade having a central mounting aperture therein corresponding in size and shape to that of the mounting boss of the arbor.

2. The concrete cutter, saw arbor and saw blade of claim 1 wherein each side surface of said mounting boss is tangent to said imaginary circle.

3. The concrete cutter, saw arbor and saw blade of claim 2 wherein said three connected straight side surfaces of said triangular mounting boss comprise first, second and third side surfaces, said first and second side surfaces joining at a 90° angle and said third side surface connecting the ends of the first and second side surfaces remote from the 90° junction.

4. The concrete cutter, saw arbor and saw blade of claim 3 wherein the connection point of said first and third side surfaces is on said outer face perimeter.

5. The concrete cutter, saw arbor and saw blade of claim 4 wherein the diameter of said arbor face is approximately two inches and the diameter of said imaginary circle is three-quarters of an inch.

6. A cutting blade for use with a concrete cutting saw having a driven shaft with a circular blade mounting arbor of predetermined diameter thereon which has a raised mounting boss to receive and position the blade and locking means to lock a saw blade to the arbor, said cutting blade comprising a generally circular flat disc having cutting segments on its outer periphery and first and second sides; and a triangular mounting aperture surrounding the center of the disc consisting of a series of three connected straight lines, each of which forms one side of the aperture, with each adjacent line meeting at a connecting point, the connecting point of two adjacent lines lying on a first imaginary circle concentric with the disc and equal in diameter to the diameter of the mounting arbor, and the connecting points of the remaining adjacent lines meeting at connecting points inside said first imaginary circle and outside of a second imaginary concentric circle with the disc and of lesser diameter than the first imaginary circle.

7. The cutting blade of claim 6 wherein each side of the triangular aperture is tangent to said second imaginary circle.

8. The cutting blade of claim 7 wherein said triangular aperture has first, second and third sides, said first and second sides joining at a 90° angle and said third side connecting the ends of the first and second sides remote from the 90° junction.

9. The cutting blade of claim 8 wherein the connection point of said first and third sides is on said first imaginary circle.

10. The cutting blade of claim 9 wherein the diameter of the first imaginary circle is two inches and the diameter of said second imaginary circle is three-quarters of an inch.

11. An arbor for mounting a saw blade on a concrete cutting saw having a driven shaft; said arbor comprising a blade mounting face with a circular perimeter of predetermined diameter; a raised mounting boss on said blade mounting face to receive and position the saw blade; and locking means to lock the saw blade to the arbor; and said arbor raised mounting boss being triangular in shape surrounding the center of said arbor and when viewed toward the mounting face consisting of a series of three connected straight side surfaces projecting vertically from said mounting face with each adjacent surface meeting at a connecting point, the connecting point of two adjacent surfaces lying on the perimeter of said arbor, and the connecting points of the remaining adjacent surface meeting at connecting points on said arbor face outside of an imaginary circle concentric with the circular perimeter of said arbor and of smaller diameter than said perimeter.

12. The arbor of claim 11 wherein each side surface of said mounting boss is tangent to said imaginary circle.

13. The arbor of claim 12 wherein said three connected straight side surfaces of said triangular mounting boss comprise first, second and third side surfaces, said first and second side surfaces joining at a 90° angle and said third side surface connecting the ends of the first and second side surfaces remote from the 90° junction.

14. The arbor of claim 13 wherein the connection point of said first and third side surfaces is on said arbor face perimeter.

15. The arbor of claim 14 wherein the diameter of said arbor face is approximately two inches and the diameter of said imaginary circle is three-quarters of an inch.

* * * * *